US010552572B2

(12) United States Patent
Fei et al.

(10) Patent No.: US 10,552,572 B2
(45) Date of Patent: Feb. 4, 2020

(54) DRAINAGE PIPE NETWORK DESIGN

(71) Applicant: Autodesk, Inc., San Rafael, CA (US)

(72) Inventors: Xiaoming Fei, Shanghai (CN); Jianwen Huang, Shanghai (CN); Lei Hua, Shanghai (CN); Yimeng He, Beijing (CN); Weihua Zhong, Shanghai (CN); Lijun Zhang, Shanghai (CN); Zeyi Xia, Shanghai (CN); Matthew Carl Anderson, Frankfort, IL (US)

(73) Assignee: AUTODESK, INC., San Rafael, CA (US)

( * ) Notice: Subject to any disclaimer, the term of this patent is extended or adjusted under 35 U.S.C. 154(b) by 987 days.

(21) Appl. No.: 15/080,420

(22) Filed: Mar. 24, 2016

(65) Prior Publication Data
US 2017/0277824 A1    Sep. 28, 2017

(51) Int. Cl.
    *G06F 17/50*    (2006.01)
(52) U.S. Cl.
    CPC .................................. *G06F 17/509* (2013.01)
(58) Field of Classification Search
    None
    See application file for complete search history.

(56) References Cited

PUBLICATIONS

Seth Hall, "Not just a pipe dream: AutoCAD Civil 3D pipe networks," 2011, Autodesk University, pp. 1-29 (Year: 2011).*

"Using Hydraflow Storm Sewers Extension with AutoCAD Civil 3D 2008: A Recommended Workflow," 2008, Autodesk, pp. 1-20 (Year: 2008).*
"Urban Drainage Design Manual," 2013, Federal Highway Administration, 478 pages (Year: 2013).*
"Drainage Manual," 2000, https://www.dot.state.mn.us/bridge/pdf/hydraulics/drainagemanual/chapter%208.pdf, 52 pages (Year: 2000).*
"NJTA Design Manual," 2014, https://www.njta.com/media/1420/dm_section_4_drainage_design_3-18-14.pdf, 161 pages (Year: 2014).*
"Micro Drainage User Manual," 2014, XP Solutions, 440 pages (Year: 2014).*
"Bentley StormCAD V8i," 2015, Bentley, 720 pages (Year: 2015).*
Harlan Bengtson, "How to use the Manning equation for storm sewer calculations," Feb. 19, 2015, Wayback Machine https://www.brighthubengineering.com/hydraulics-civil-engineering/64174-how-to-use-the-manning-equation-for-storm-sewer-calculations/, 6 pages (Year: 2015).*
"Manning formula", Wikipedia, May 5, 2015. http://en.wikipedia.org/wiki/Manning_formula.
"Urban Drainage Design Manual", Hydraulic Engineering Circular No. 22, 3rd Edition, Publication No. FHWA-NHI-10-009, Sep. 2009 (Revised Aug. 2013), U.S. Dept. of Transportation, Federal Highway Administration, pp. 7-30-7-34.

* cited by examiner

*Primary Examiner* — Kamini S Shah
*Assistant Examiner* — Russ Guill
(74) *Attorney, Agent, or Firm* — Gates & Cooper LLP

(57) ABSTRACT

A method, system, apparatus, and computer program product provide the ability to design a drainage pipe solution. A profile of a surface segment (that includes a surface slope) is acquired. A first pipe size and a first pipe slope or calculated based on a proper velocity. A second pipe size and a second pipe slope are calculated based on the surface slope. A first pipe covering and a second pipe covering for the first pipe size and the second pipe size, for the surface segment is computed. A lower of the first pipe covering and the second pipe covering is selected as the drainage pipe solution.

14 Claims, 13 Drawing Sheets

DRAINAGE PIPE NETWORK DESIGN

BACKGROUND OF THE INVENTION

1. Field of the Invention

The present invention relates generally to a drainage pipe network, and in particular, to a method, system, apparatus, and article of manufacture for designing a drainage pipe network based on velocity, slope, and pipe covering.

2. Description of the Related Art

When designing a drainage pipe network, engineers must perform a significant amount of work to calculate pipes manually. Engineers need to calculate pipe size, slope, invert and obvert elevation, and also need to check velocity and the pipe covering to determine if constraints can be met. Such a process requires substantial manual efforts and calculations and often times still results in a poor solution. Accordingly, what is needed is an automated process for calculating the proper drainage pipe size and slope. To better understand these problems, a description of prior art drainage pipe design may be useful.

The design procedure for designing a drainage pipe network is stated in section 7.4 of the Hydraulic Engineering Circular No. 22 (HEC-22) published by the Federal Highway Administration. FIG. 1 illustrates a simplified flow for the manual calculation of a pipe design based on the HEC-22 of the prior art.

At step 102, a pipe slope is assumed (e.g., based on user input or generated by a rule).

At step 104, the pipe size is calculated by manning's equation/formula with a known design flow and manning's number (a full gravity flow may be assumed). Manning's formula is an empirical formula that estimates the average velocity of a liquid flowing in a conduit that does not completely enclose the liquid (e.g., an open channel flow). All flow is such open channels are driven by gravity. The Manning number (also known as the Manning coefficient) is an empirically derived coefficient that is dependent on many factors including surface roughness and sinuosity.

At step 106, according to a calculated result (of the pipe size), an approximate pie size may be selected from a pipe content catalog.

At step 108, the real velocity in the pipe is calculated by Manning's equation.

At step 110, a check is conducted to determine whether the velocity can meet the velocity rule (e.g., if the real velocity is smaller than a maximum [e.g., from a rule] and larger than a minimum velocity [e.g., 3 feet/sec]). If the velocity meets the velocity rule, the pipe design is finished and a solution (that includes the pipe size and slope) is obtained at 112. However, if the velocity rule is not met, the process resumes at step 102 using a new assumed pipe slope (i.e., the slope is adjusted/recalculated and the process starts over).

In the above prior art workflow, there are various problems. The first issue arises with the assumption of the pipe slope at step 102. As the pipe slope increases, pipe size will be decreased and pipe covering will be increased. Accordingly, both too large of a pipe size and too much pipe covering will enlarge the pipe network cost. Accordingly, it is difficult to determine a proper slope.

The second problem arises with respect to the significant amount of work needed by engineers to perform the manual calculation of the pipes. Engineers need to calculate pipe size, slope, invert and obvert elevation, and also need to check the velocity and pipe covering to determine if constraints are met.

A third problem arises in that there is more than one available solution. For each pipe slope, there is a corresponding pipe size. If there are a lot of solutions that all comply with the hydraulic calculations and rules, how does one determine the optimal/best solution? Often times, engineers select one solution manually, depending on experience and special design conditions.

SUMMARY OF THE INVENTION

Embodiments of the invention overcome the problems of the prior art by. Rather than merely automating a slope determination, embodiments of the invention provide a self-cleaning pipe system (i.e., a pipe system that is large enough to carry the required flow and small enough [and sloped enough] to clean itself out) that incorporates pipe velocity in both the pipe sizing and sloping of a pipe segment during the design phase. The calculations performed in the design process are automated and the appropriate solution is selected from multiple solutions automatically.

A profile of a surface segment (that includes a surface slope) for a drainage pipe system is acquired. A first pipe size and a first pipe slope are calculated based on a proper velocity. A second pipe size and a second pipe slope are calculated based on the surface slope. A first pipe covering for the first pipe size for the surface segment is computed. A second pipe covering for the second pipe size for the surface segment is computed. The first pipe covering and the second pipe covering are compared, and the lower of the two is selected as a drainage pipe solution.

When calculating the first pipe size and first pipe slope based on proper velocity, the proper velocity is assumed based on a flow. A calculated first pipe size is calculated based on the proper velocity. Based on the calculated first pipe size, a first catalog pipe size is selected from a pipe content catalog. A calculated pipe slope and calculated pipe velocity are calculated for the first catalog pipe size, based on Manning's equation. A determination is then made regarding whether the calculated pipe velocity meets/complies with a velocity requirement. If the calculated pipe velocity meets the requirement, the first catalog pipe size and calculated pipe slope are selected as the first pipe size and first pipe slope respectively. If the calculated pipe velocity does not meet the requirement, a new pipe size is selected as the calculated pipe size, and the process repeats with the calculating of the calculated pipe velocity.

When calculating the second pipe size and the second pipe slope based on the surface slope, a (full) flow is assumed. A calculated second pipe size is calculated based on the surface slope and the flow. A calculated pipe velocity is also calculated. Various steps may then be performed to ensure that the calculated pipe velocity is within velocity requirements. Based on the calculated pipe velocity, a second catalog pipe size is selected from a pipe content catalog. A second calculated pipe velocity and second calculated pipe slope (for the second catalog pipe size) are calculated based on Manning's equation. A determination is then made regarding whether the second calculated pipe velocity meets/complies with the velocity requirements. If the velocity requirements are met, the second catalog pipe size and second calculated pipe slope are selected as the second pipe size and second pipe slope respectively. If the velocity requirements are not met, a new catalog pipe size is selected and the process repeats with the calculation of the second calculated pipe velocity and slope.

The above steps may be repeated for each segment of a drainage system. Further, the surface segment may consist of a pipe segment that is in between access holes. Once designed, embodiments of the invention actually construct a drainage pipe system based on the drainage pipe solution (e.g., by outputting/printing/displaying the solution for use in the construction).

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
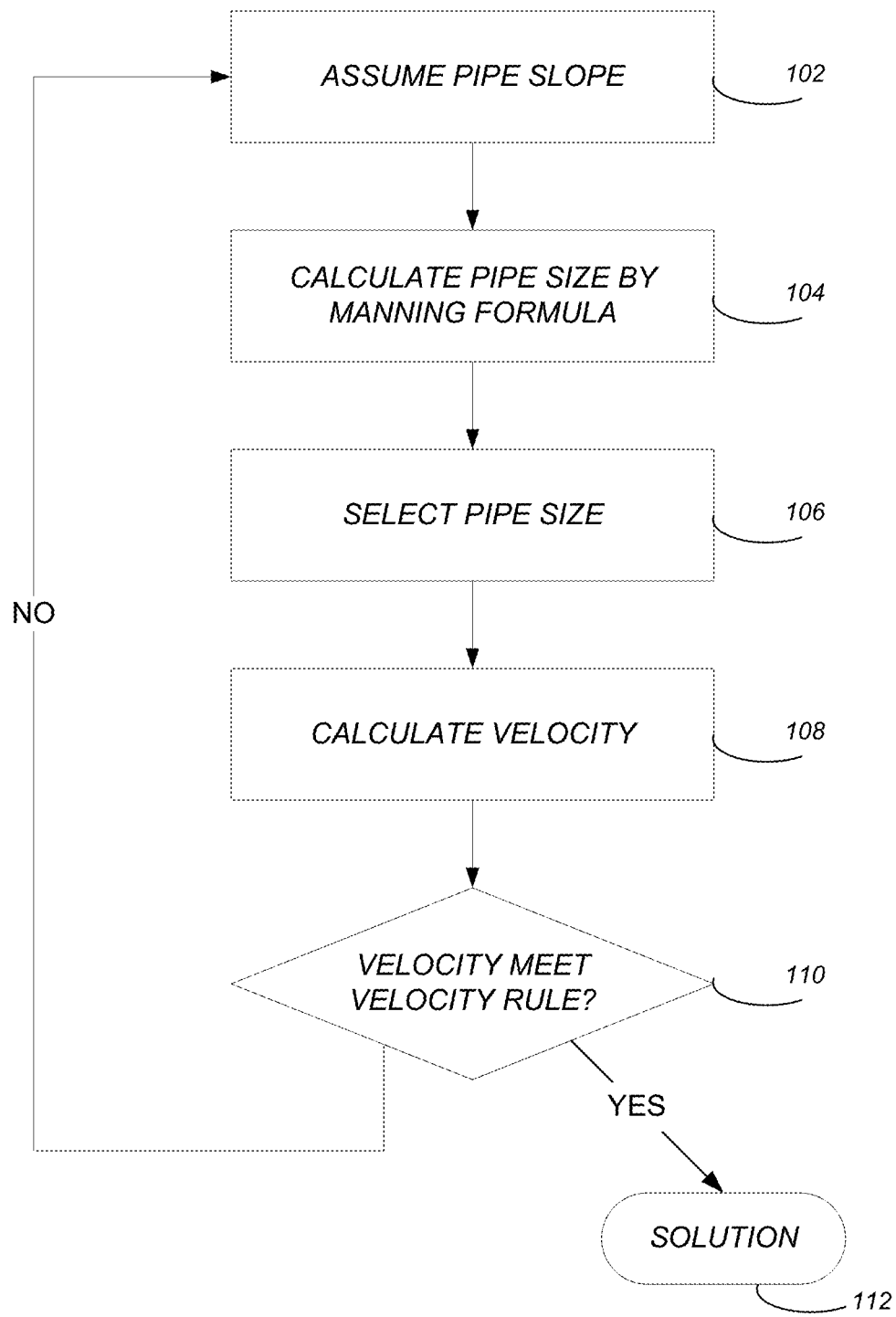
FIG. 1 illustrates a simplified flow for the manual calculation of a pipe design based on the HEC-22 of the prior art.
Figure 2:
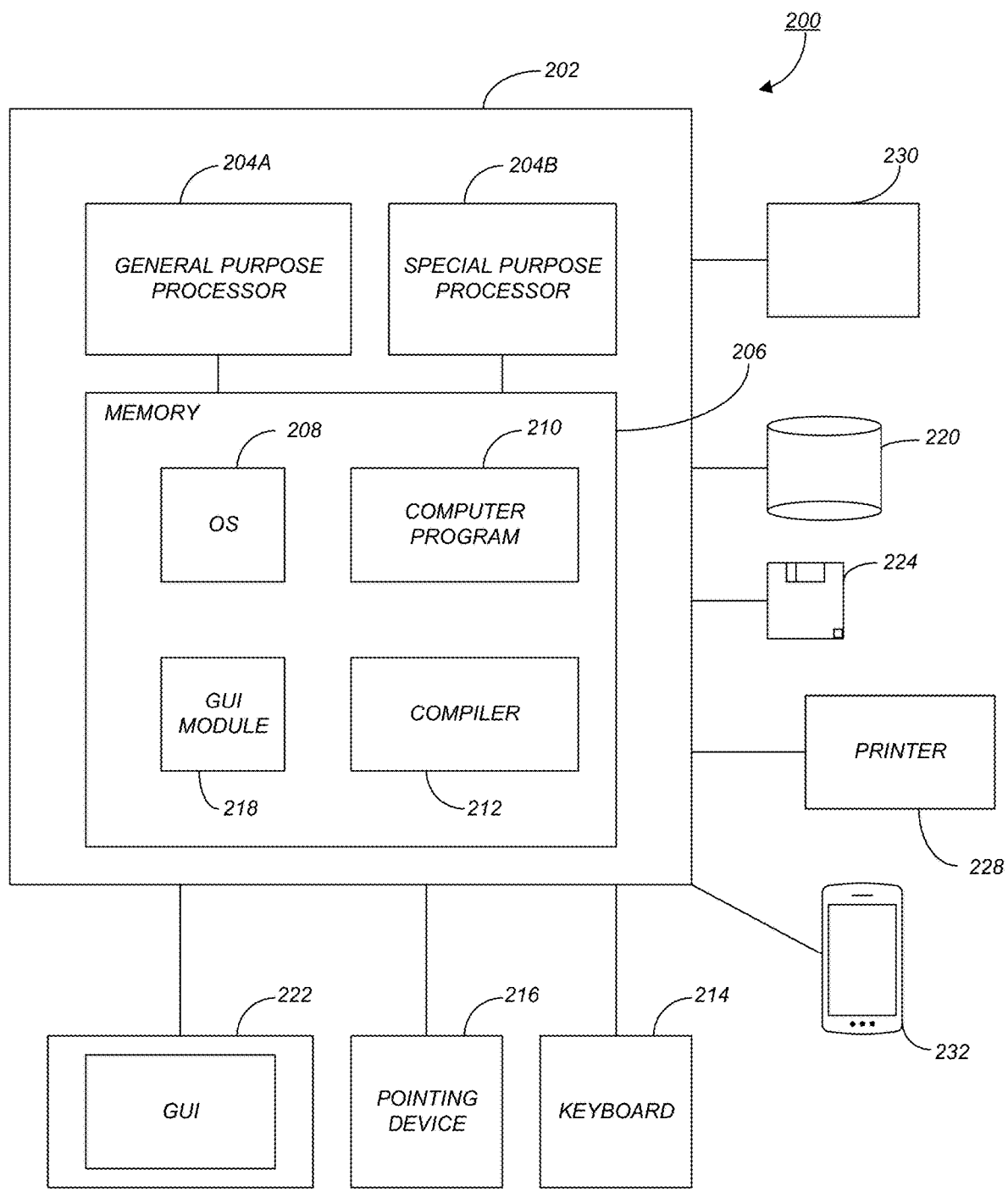
FIG. 2 is an exemplary hardware and software environment used to implement one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.
Overview Embodiments of the invention provide the ability to design a drainage pipe network/segment utilizing a variety of different methods while minimizing the pipe covering/cost. Embodiments of the invention are provided in the INFRAWORKS 360 product available from the assignee of the present application, AUTODESK, INC.
Hardware Environment FIG. 2 is an exemplary hardware and software environment 200 used to implement one or more embodiments of the invention. The hardware and software environment includes a computer 202 and may include peripherals. Computer 202 may be a user/client computer, server computer, or may be a database computer. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to, and/or integrated with, other devices, including input/output (I/O) devices such as a keyboard 214, a cursor control device 216 (e.g., a mouse, a pointing device, pen and tablet, touch screen, multi-touch device, etc.) and a printer 228. In one or more embodiments, computer 202 may be coupled to, or may comprise, a portable or media viewing/listening device 232 (e.g., an MP3 player, IPOD, NOOK, portable digital video player, cellular device, personal digital assistant, etc.). In yet another embodiment, the computer 202 may comprise a multi-touch device, mobile phone, gaming system, internet enabled television, television set top box, or other internet enabled device executing on various platforms and operating systems.

In one embodiment, the computer 202 operates by the general purpose processor 204A performing instructions defined by the computer program 210 under control of an operating system 208. The computer program 210 and/or the operating system 208 may be stored in the memory 206 and may interface with the user and/or other devices to accept input and commands and, based on such input and commands and the instructions defined by the computer program 210 and operating system 208, to provide output and results. In embodiments of the invention, computer program 210 comprises the INFRAWORKS 360 application available from AUTODESK, INC.

Output/results may be presented on the display 222 or provided to another output device for presentation or further processing or action. In one embodiment, the display 222 comprises a liquid crystal display (LCD) having a plurality of separately addressable liquid crystals. Alternatively, the display 222 may comprise a light emitting diode (LED) display having clusters of red, green and blue diodes driven together to form full-color pixels. Each liquid crystal or pixel of the display 222 changes to an opaque or translucent state to form a part of the image on the display in response to the data or information generated by the processor 204 from the application of the instructions of the computer program 210 and/or operating system 208 to the input and commands. The image may be provided through a graphical user interface (GUI) module 218. Although the GUI module 218 is depicted as a separate module, the instructions performing the GUI functions can be resident or distributed in the operating system 208, the computer program 210, or implemented with special purpose memory and processors.

In one or more embodiments, the display 222 is integrated with/into the computer 202 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 202 according to the computer program 210 instructions may be implemented in a special purpose processor 204B. In this embodiment, the some or all of the computer program 210 instructions may be implemented via firmware instructions stored in a read only memory (ROM), a programmable read only memory (PROM) or flash memory within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program 210 instructions. In one embodiment, the special purpose processor 204B is an application specific integrated circuit (ASIC).

The computer 202 may also implement a compiler 212 that allows an application or computer program 210 written in a programming language such as C, C++, Assembly, SQL, PYTHON, PROLOG, MATLAB, RUBY, RAILS, HASKELL, or other language to be translated into processor 204 readable code. Alternatively, the compiler 212 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 210 accesses and manipulates data accepted from I/O devices and stored in the memory 206 of the computer 202 using the relationships and logic that were generated using the compiler 212.

The computer 202 also optionally comprises an external communication device such as a modem, satellite link, Ethernet card, or other device for accepting input from, and providing output to, other computers 202.

In one embodiment, instructions implementing the operating system 208, the computer program 210, and the compiler 212 are tangibly embodied in a non-transitory computer-readable medium, e.g., data storage device 220, which could include one or more fixed or removable data storage devices, such as a zip drive, floppy disc drive 224, hard drive, CD-ROM drive, tape drive, etc. Further, the operating system 208 and the computer program 210 are comprised of computer program 210 instructions which, when accessed, read and executed by the computer 202, cause the computer 202 to perform the steps necessary to implement and/or use the present invention or to load the program of instructions into a memory 206, thus creating a special purpose data structure causing the computer 202 to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 202.

Figure 3:
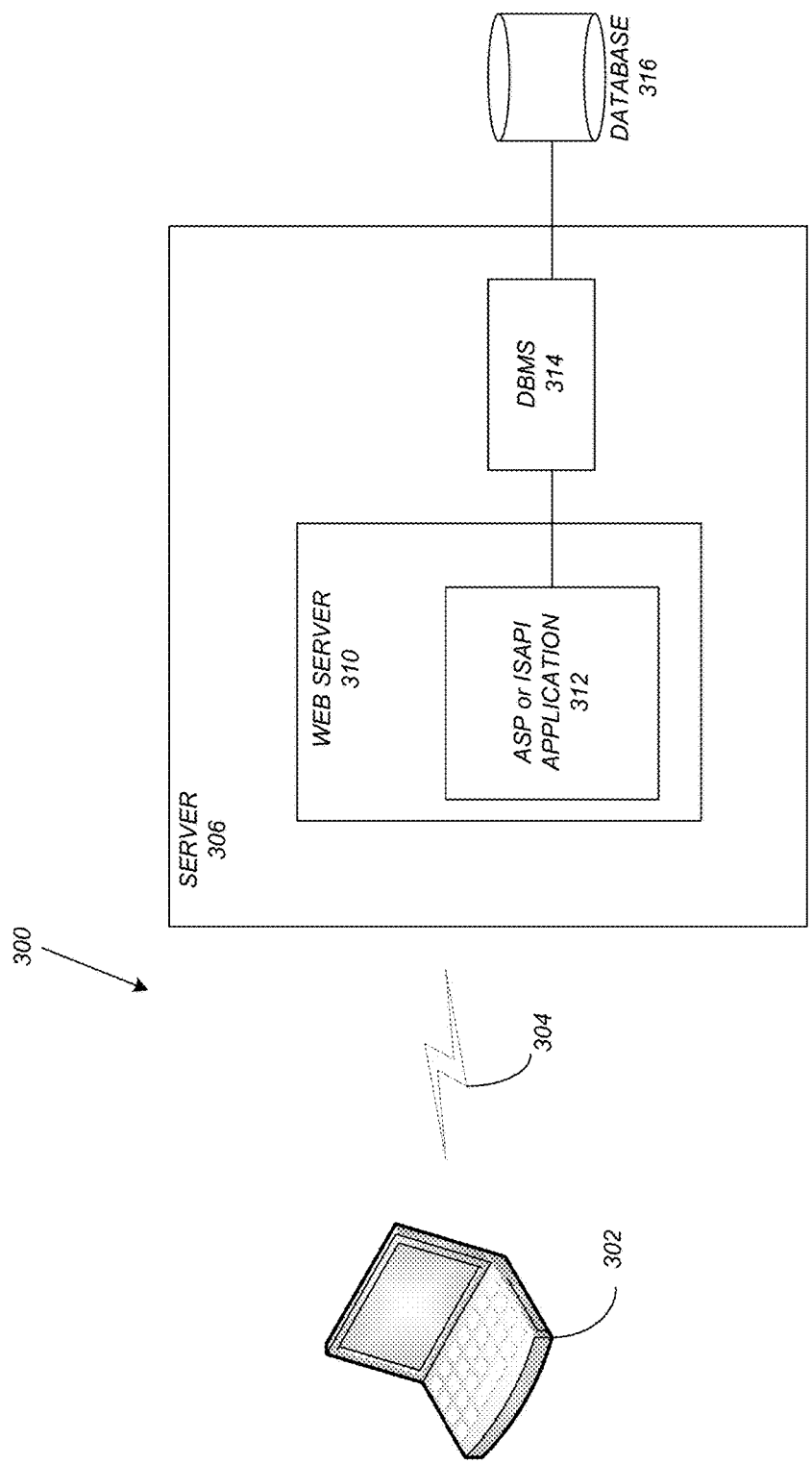
FIG. 3 schematically illustrates a typical distributed/cloud-based computer system using a network to connect client computers to server computers in accordance with one or more embodiments of the invention.

FIG. 3 schematically illustrates a typical distributed/cloud-based computer system 300 using a network 304 to connect client computers 302 to server computers 306. A typical combination of resources may include a network 304 comprising the Internet, LANs (local area networks), WANs (wide area networks), SNA (systems network architecture) networks, or the like, clients 302 that are personal computers or workstations (as set forth in FIG. 2), and servers 306 that are personal computers, workstations, minicomputers, or mainframes (as set forth in FIG. 2). However, it may be noted that different networks such as a cellular network (e.g., GSM [global system for mobile communications] or otherwise), a satellite based network, or any other type of network may be used to connect clients 302 and servers 306 in accordance with embodiments of the invention.

A network 304 such as the Internet connects clients 302 to server computers 306. Network 304 may utilize ethernet, coaxial cable, wireless communications, radio frequency (RF), etc. to connect and provide the communication between clients 302 and servers 306. Further, in a cloud-based computing system, resources (e.g., storage, processors, applications, memory, infrastructure, etc.) in clients 302 and server computers 306 may be shared by clients 302, server computers 306, and users across one or more networks. Resources may be shared by multiple users and can be dynamically reallocated per demand. In this regard, cloud computing may be referred to as a model for enabling access to a shared pool of configurable computing resources.

Clients 302 may execute a client application or web browser and communicate with server computers 306 executing web servers 310. Such a web browser is typically a program such as MICROSOFT INTERNET EXPLORER, MOZILLA FIREFOX, OPERA, APPLE SAFARI, GOOGLE CHROME, etc. Further, the software executing on clients 302 may be downloaded from server computer 306 to client computers 302 and installed as a plug-in or ACTIVEX control of a web browser. Accordingly, clients 302 may utilize ACTIVEX components/component object model (COM) or distributed COM (DCOM) components to provide a user interface on a display of client 302. The web server 310 is typically a program such as MICROSOFT'S INTERNET INFORMATION SERVER.

Web server 310 may host an Active Server Page (ASP) or Internet Server Application Programming Interface (ISAPI) application 312, which may be executing scripts. The scripts invoke objects that execute business logic (referred to as business objects). The business objects then manipulate data in database 316 through a database management system (DBMS) 314. Alternatively, database 316 may be part of, or connected directly to, client 302 instead of communicating/obtaining the information from database 316 across network 304. When a developer encapsulates the business functionality into objects, the system may be referred to as a component object model (COM) system. Accordingly, the scripts executing on web server 310 (and/or application 312) invoke COM objects that implement the business logic. Further, server 306 may utilize MICROSOFT'S TRANSACTION SERVER (MTS) to access required data stored in database 316 via an interface such as ADO (Active Data Objects), OLE DB (Object Linking and Embedding DataBase), or ODBC (Open DataBase Connectivity).

Generally, these components 300-316 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 302 and 306 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 302 and 306. Embodiments of the invention are implemented as a software application on a client 302 or server computer 306. Further, as described above, the client 302 or server computer 306 may comprise a thin client device or a portable device that has a multi-touch-based display.

Software Embodiments

Figure 4:
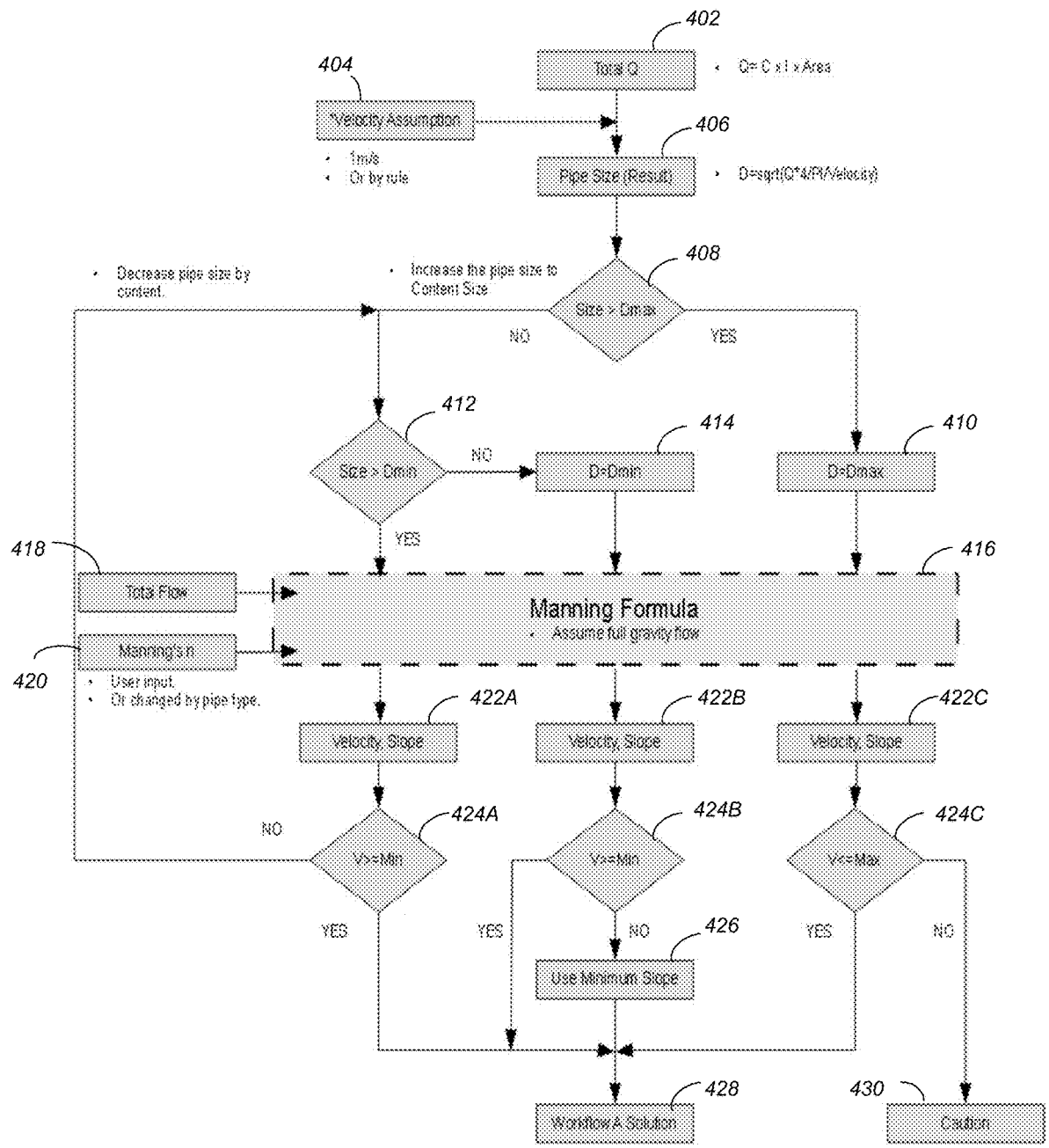
FIG. 4 illustrates logical workflow A that is used to calculate pipe size and slope based on proper velocity in accordance with one or more embodiments of the invention.
Figure 5:
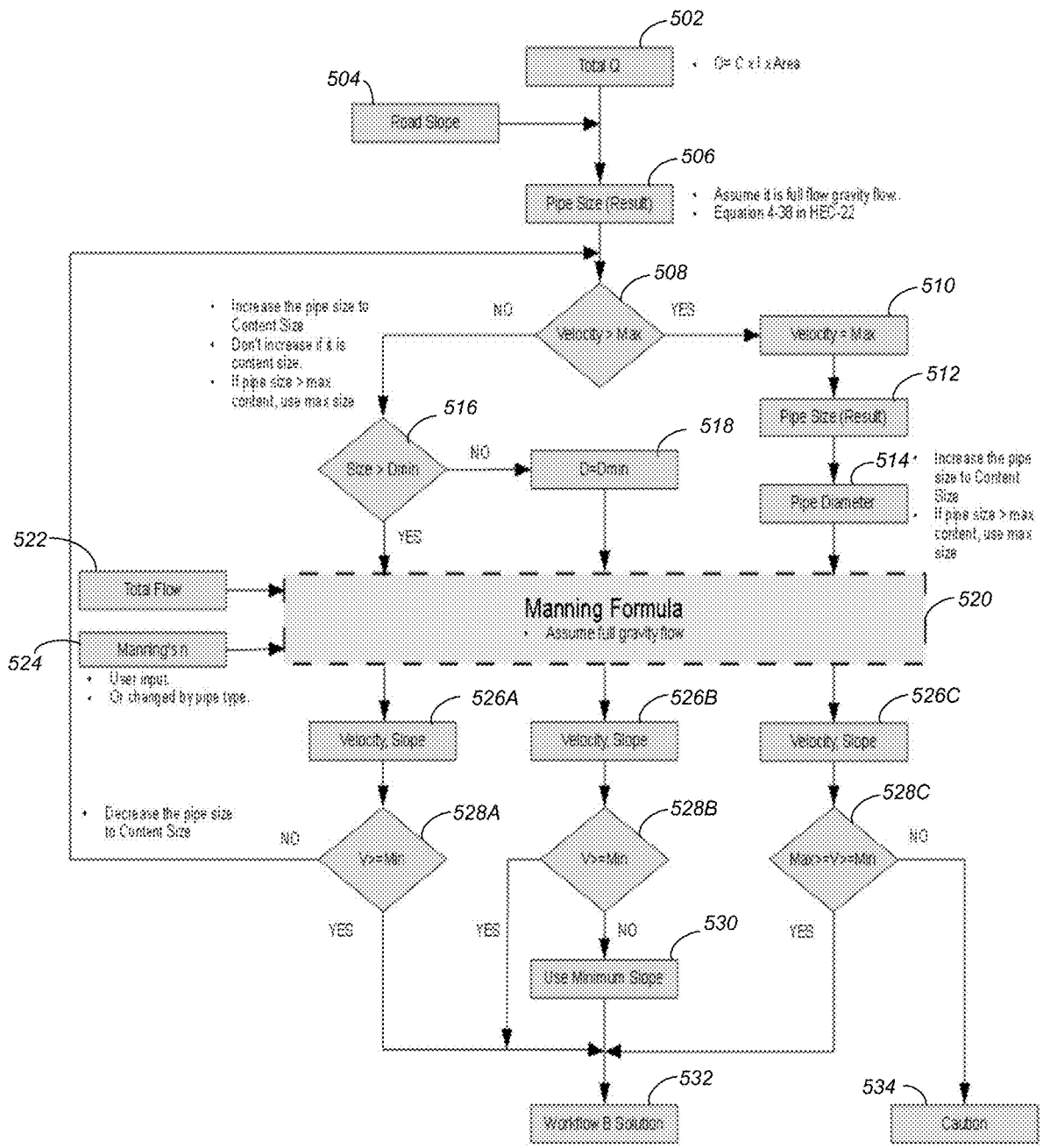
FIG. 5 illustrates logical workflow B that is used to calculate pipe size and pipe slope based on proper road slope in accordance with one or more embodiments of the invention.

To provide the ability to design a drainage pipe system/network/segment in an automated fashion, two workflows are performed and then compared to determine the appropriate pipe solution. Initially, a profile of a surface segment (that has a surface slope) (for a drainage system) is acquired (e.g., via images from a satellite, camera, scan data, etc.). Thereafter, the two workflows are performed. FIG. 4 illustrates logical workflow A that is used to calculate pipe size and slope based on proper velocity. FIG. 5 illustrates logical workflow B that is used to calculate pipe size and pipe slope based on proper road slope.

Pipe Size Calculation Based on Proper Velocity

Referring to FIG. 4, pipe size and slope calculation based on the proper velocity is illustrated. At 402, the total volumetric flow rate (discharge) (Q) is determined. As used herein the total Q 402 may be determined based on the runoff coefficient (C) times the length (l) of the run times the total Area (i.e., Q=C×l×Area).

At 404, a suggested velocity is assumed based on the desired flow Q 402. For the velocity assumption 404, it is an experience number to get the most proper pipe size. The flow could always be 1 m/s, but this may make the pipe larger than that desired by engineers. To avoid an undesirable pipe size, a table of flow and velocity may be used, for example:

| FLOW | VELOCITY ASSUMPTION |
|---|---|
| 0-2 cms | 1 m/s |
| 2-4 cms | 1.5 m/s |
| 4-10 cms | 2 m/s |
| >10 cms | 3 m/s |

If using the above table, one may need to make sure that the pipe size downstream is greater than or equal to the pipe size upstream (e.g., Pipe Size downstream>=Pipe Size upstream).

At 406, based on total Q 402 and the velocity assumption 404, the pipe size is calculated by velocity. The pipe size diameter may be the square root of the Q*4/PI/Velocity (i.e., $D=\sqrt{Q*4/\pi/Velocity}$).

According to the calculated result 406, an approximate pipe size is selected from a pipe content catalog. In this regard, the calculated pipe size 406 is compared to a maximum pipe size from the pipe content catalog at step 408. If the calculated pipe size is greater than the max (i.e., Size>Dmax), the largest pipe size from the catalog is selected at step 410. If the calculated pipe size 406 is less than the max pipe size in the catalog (as determined at 408), steps 412 and 414 are performed to select a pipe size from the catalog. At step 412, the calculated pipe size 406 is compared to the minimum pipe size in the catalog. If the pipe size 406 is greater than the minimum, the nearest pipe size from the catalog may be used (e.g., the closest based on pipe size, and if in between—the next largest may be selected). If the pipe size 406 is less than the minimum (i.e., Size<Dmin), then the smallest pipe size from the catalog is selected at step 414 (i.e., D=Dmin). If particular, if size<DMax, embodiments of the invention "increase the pipe size to content size", which means select a bigger pipe size in content (e.g., from the content catalog). For example, content is an available list of pipe with different sizes (usually content provided from manufacturers). IN a specific example, suppose pipe content (i.e., a pipe content catalog) includes pipe sizes of 300 mm, 400 mm . . . 1600 mm. If the calculated size is 330 mm at step 406, then at step 412, the size will be 400 mm.

At step 416, the pipe slope and velocity are calculated based on Manning's formula/equation (assuming full gravity flow). As input, step 416 utilizes the pipe sizes input from 410-416, the total desired flow 418, and the Manning's number 420 (which may be input by the user or may change based on the pipe type). The output from the calculation is the velocity and slope 422A, 422B, and 422C (which are based on the various pipe sizes identified at 410-414.

At steps 424-426, the velocity is checked to determine if it meets a velocity requirement. The velocity is compared to minimum/maximum velocities at step 424. For example, at step 424A, the velocity (from 422A) is compared to a minimum velocity. If the computed velocity is not greater than or equal to the minimum, the pipe size is reduced/decreased by selecting the next smaller pipe from the catalog (i.e., a pipe size is selected in a list from the content catalog/library) (to increase the velocity), and the process continues at step 412. If the velocity is greater than or equal to the minimum, the process is complete and the solution for workflow A is output at 428. At step 424B, the velocity 422B (based on setting the pipe size to the minimum diameter allowable [from the content catalog]), is compared to the minimum velocity. If the velocity is greater than or equal to the minimum required velocity, the process is complete and the velocity and slope 422B is output as the solution for workflow A. However, if the velocity from 422B is not greater than or equal to the minimum velocity, the minimum slope is used at 426 and the solution is output at 428.

Similar to comparisons at 424A and 424B, at 424C, the computed velocity from 422C is compared to the maximum permitted velocity. If the computed velocity is greater than the maximum, the pipe could degrade overtime. Accordingly, a caution message may be sent to the user at 430 informing the user that the limit of pipe velocity has been exceeded. However, if the velocity is less than or equal to the maximum, the computed velocity and slope 422C are provided as the solution to workflow A at 428.

In view of the above, workflow A: (1) assumes a suggested velocity based on flow (step 404); (2) calculates a pipe size by velocity (step 406); (3) according to the calculated result, selects an approximate pipe size from the pipe content catalog (step 408); (4) calculates the pipe slope and velocity by Manning's equation/formula (step 422); (5) checks the velocity to determine if it meets requirements (step 424); and (6) if requirements are met, the solution design is finished, including pipe size and slope (step 428); if not, the process returns to step (3).

Pipe Size and Slope Calculation Based on Proper Surface Slope

FIG. 5 illustrates the logical flow for calculating the pipe size and slope based on the proper surface slope (close to the surface slope) in accordance with one or more embodiments of the invention.

Similar to FIG. 4, at 502, the total volumetric flow rate (discharge) (Q) is determined. As used herein the total Q 402 may be determined based on the runoff coefficient (C) times the length (l) of the run times the total Area (i.e., Q=C×l× Area).

At 506, the pipe size is calculated by surface slope and flow. In other words, based on the surface flow Q 502 and surface slope 504, the pipe size is calculated. The pipe size may be computed with an assumption of a full flow gravity flow as well as equation 4-38 in HEC-22.

The velocity in the pipe is calculated and checked at steps 508-510. At step 508, the velocity is compared to a maximum velocity. If the maximum velocity has been exceed, the velocity is set to the max at step 510.

At steps 512-518, an appropriate pipe size is selected from the pipe content catalog. Continuing from step 510, based on the maximum velocity a pipe size is computed at step 512. The pipe size 512 is then used to determine the diameter of an actual pipe from the content catalog at step 514. In this regard, the computed pipe size is increased to a pipe size from the content catalog, and if the pipe size is greater than the maximum size of a pipe from the content catalog, the maximum pipe size from the content catalog is used. In other words, based on a computed pipe size, the next bigger actual pipe size from the catalog is selected (or the maximum pipe size is selected).

If the maximum velocity has not been exceeded (as determined at 508), the pipe size is increased to a size from the content catalog (unless the pipe size is already equivalent to a size from the content catalog). In addition, if the pipe size is greater than a maximum pipe size from the content catalog, the maximum pipe size is used. Thus, at step 516, a determination is made regarding whether the computed size is larger than a minimum pipe size from the catalog. If the computed pipe size is less than or equal to a minimum pipe size from the catalog, the minimum pipe size from the content catalog is used at step 518. If the minimum computed pipe size is greater than the minimum content catalog pipe size, the process proceeds to the next step.

At step 520, the velocity and slope are re-calculated based on Manning's equation/formula (e.g., based on the pipe diameters, total flow 522, and Manning's number 524). The output from the computations are the velocity and slope 526A-526C.

At step 528, the velocity is checked to determined whether it meets the velocity requirement. Thus, at step 528A, the velocity is compared to a minimum velocity. If the minimum velocity has not been met, the pipe size is decreased to the next lower content size, and the process continues at step 508. At step 528B, the velocity is greater than or equal to the minimum velocity, the process is complete and the solution for workflow B 532 is output. If the velocity is less than the minimum velocity (as determined at step 528B), the minimum slope is used at step 530, and the velocity and slope are used as the workflow B solution 532. At step 528C (i.e., where the pipe size is based on velocity per steps 508-514), a determination is made regarding whether the velocity is less than the maximum velocity and greater than or equal to the minimum velocity. If the velocity is in between the maximum and minimum, the velocity and slope are used and output as part of workflow B solution 532. However, if the velocity is not in between the maximum and minimum, a caution message may be sent to the user.

In view of the above, workflow B is used to calculate the pipe size and slope based on the surface slope by: (1) assuming the pipe is in full flow; (2) calculating the pipe size by surface slope and flow; (3) calculating the velocity in the pipe and checking it; (4) selecting an approximate pipe size from the pipe content catalog; (5) re-calculating the velocity and slope by Manning's equation/formula; (6) checking the velocity to determine whether it meets the requirements; and (7) if the velocity meets the requirements, the solution B design is finished (including pipe size and slope); if not, the process continues back at step (4).

Comparison of Pipe Covering for Two Solutions

Figure 6:
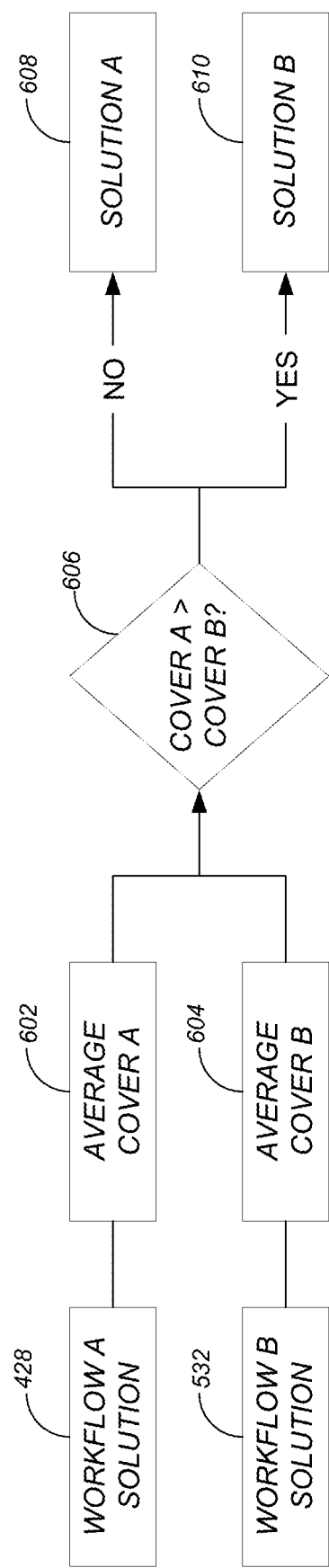
FIG. 6 illustrates the logical flow for comparing the pipe covering in accordance with one or more embodiments of the invention.

Once the two workflow solutions have been computed, the next step is to compare the pipe covering for the two solutions and select the smaller one. FIG. 6 illustrates the logical flow for comparing the pipe covering in accordance with one or more embodiments of the invention.

At step 602, the average pipe covering for workflow A solution 428 is computed. At step 604, the average pipe covering for workflow B solution 532 is computed.

At step 606, the average pipe cover A 602 is compared to the average pipe cover B 604. Whichever solution 428/532 requires less coverage is used as the solution at 608 and 610. In this regard, since increased pipe covering contributes more on cost saving than the increase of pipe size, the pipe covering is considered a key point to select the proper solution.

Exemplary Use Cases

Figure 7A:
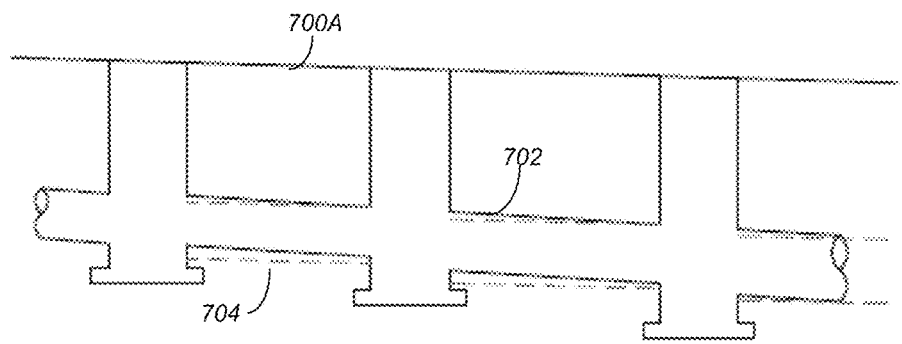
FIGS. 7A-7C illustrate three cases for different surface slopes in accordance with one or more embodiments of the invention.
Figure 7B:
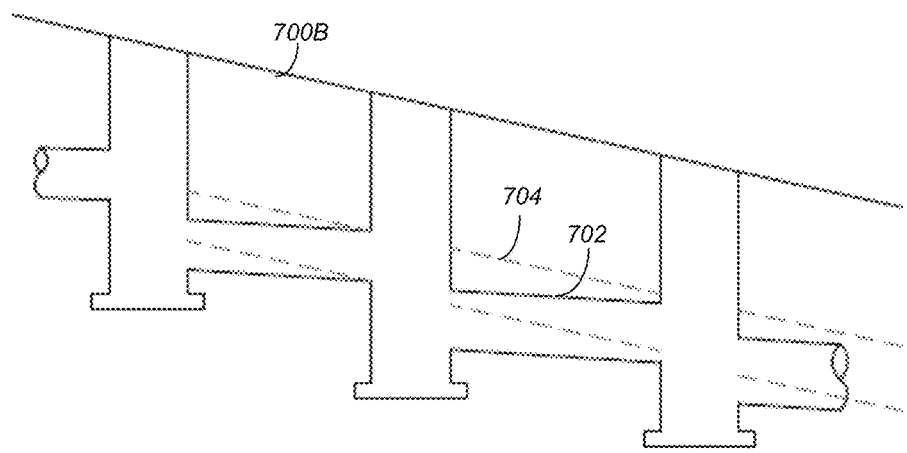
Figure 7C:
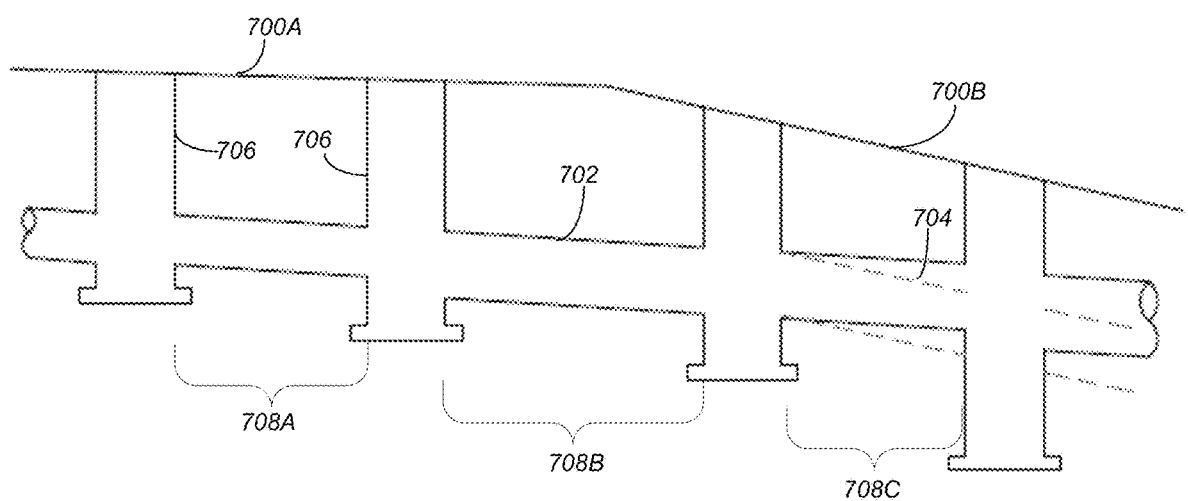

FIGS. 7A-7C illustrate three cases for different surface slopes in accordance with one or more embodiments of the invention. FIG. 7A illustrates a mile surface slope. FIG. 7B illustrates a steep surface slope. FIG. 7C illustrates a transition from a mild surface slope to a steep surface slope. In FIGS. 7A-7C, lines 702 illustrate the pipe calculated by workflow A, lines Referring to FIG. 7A, the surface slope 700A is mild, and the piping for workflow A 702 provides a better solution (less pipe covering) that the pipe solution of workflow B 704 (the workflow B solution has a bigger pipe size and a smaller slope).

Referring to FIG. 7B, the surface slope 700B is steep. The solution for workflow A 702 is displayed as well as the solution for workflow B 704. Based on a comparison of pipe covering, the solution of workflow B 704 is preferred.

Referring to FIG. 7C, the surface slope transitions from mile 700A to steep 700B. The vertical lines 706 are indicative of manhole covers/access holes and pipe segments 708A-C run between such manhole covers/access holes. In accordance with embodiments of the invention, both workflow solutions A and B are calculated for each segment 708 and then compared to determine which solution requires less pipe covering. Accordingly, for the first two segments 708A and 708B, workflow solution A 702 is the better/preferred solution. However, when the surface slope 700 transitions to a steep slope 700B, for segment 708C, the workflow solution B 704 is the better/preferred solution.

Figure 8A:
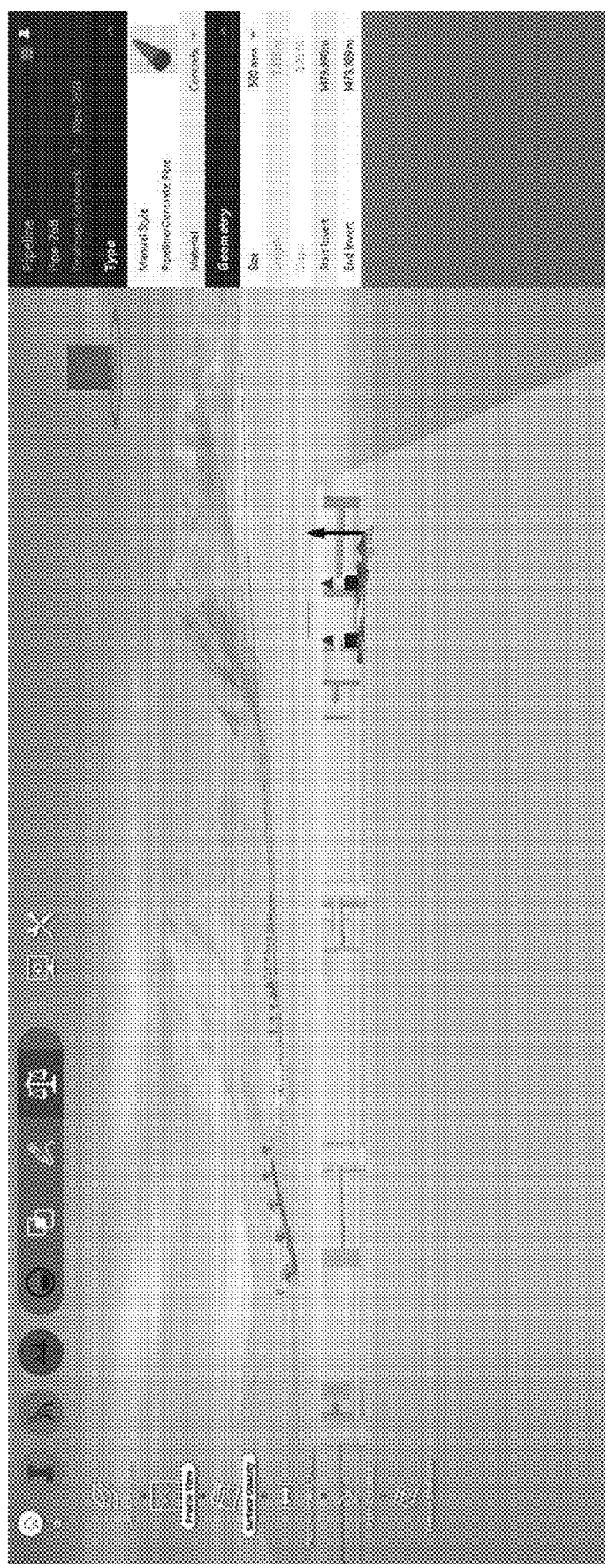
FIGS. 8A-8F illustrate screen shots of graphical user interfaces from the INFRAWORKS products showing the use of the drainage pipe solution system in accordance with one or more embodiments of the invention.
Figure 8B:
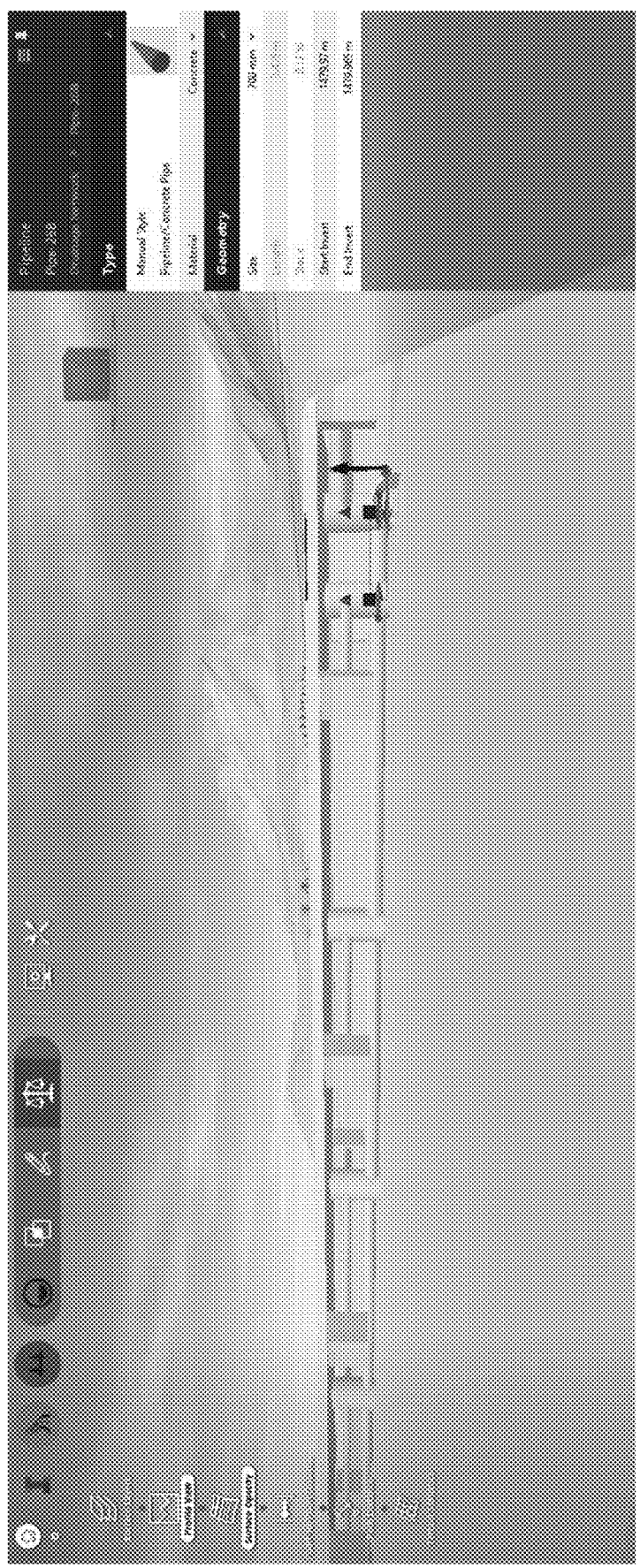
Figure 8C:
Figure 8D:
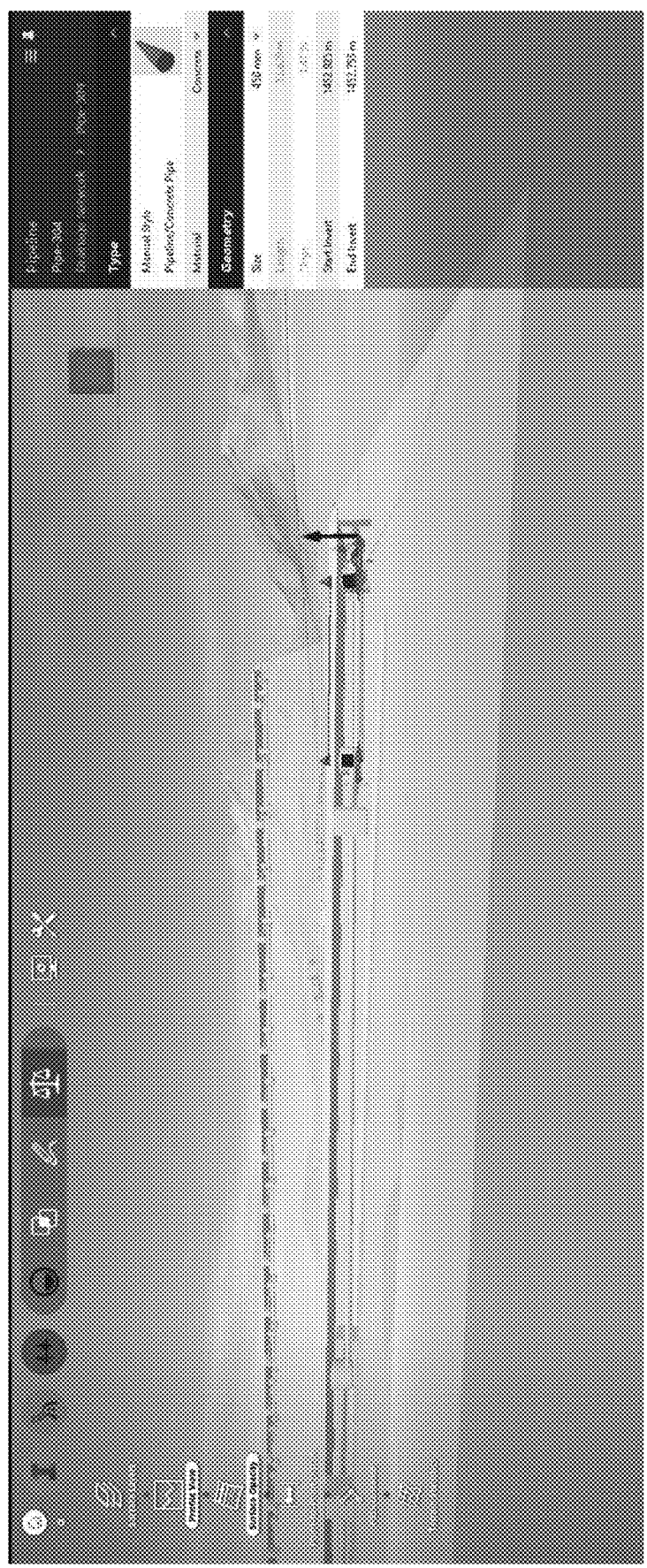
Figure 8E:
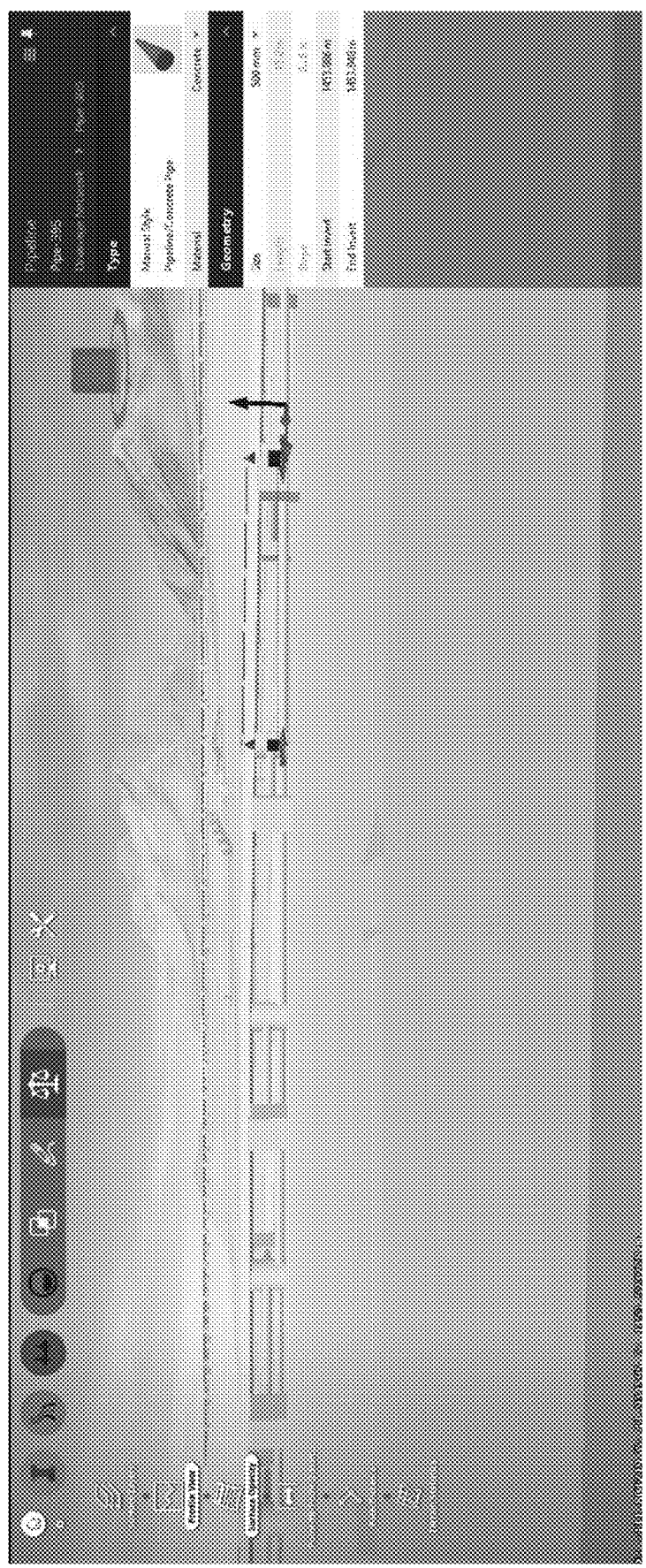
Figure 8F:

FIGS. 8A-8F comprise screen shots of graphical user interfaces from the INFRAWORKS products showing the use of the drainage pipe solution system in accordance with one or more embodiments of the invention. In particular, FIGS. 8A, 8C, and 8E illustrate a piping design before the pipe sizing while FIGS. 8B, 8D, and 8F respectively illustrate the piping design after performing pipe sizing for the corresponding road surfaces in accordance with one or more embodiments of the invention (where the better solution from Workflow A or B was selected appropriately for optimized cost savings). The longitudinal road slope in the three cases (i.e., case 1—FIGS. 8A and 8B, case 2—FIGS. 8C and 8D, and case 3—FIGS. 8E and 8F) are 0.2%, 2%, and from 02.%-2% respectively.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide the ability to determine the best/preferred solution for selecting a piping design that is based on multiple different design approaches. In the workflow A design solution, a suggested velocity is used to calculate pipe size and slope, thereby balancing pipe size and slope. It may be noted that a large velocity will make the pipe smaller, but can cause a large slope and high hydraulic loss. Likewise, less velocity will make the slope smaller and have less hydraulic loss, but will cause a larger pipe size. The suggested velocity is a proper velocity based on flow, thereby balancing pipe size and slope in calculations. In contrast with basing calculations on a suggested velocity, in the workflow B design solution, a surface slope is used to calculate pipe size and pipe slope. The best/preferred solution is then determined by determining which solution requires less pipe covering.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for designing a drainage pipe solution, comprising:
    acquiring a profile of a surface segment comprising a surface slope;
    calculating a first pipe size and a first pipe slope based on a proper velocity;
    calculating a second pipe size and a second pipe slope based on the surface slope;
    computing a first pipe covering for the first pipe size for the surface segment;
    computing a second pipe covering for the second pipe size for the surface segment; and
    selecting a lower of the first pipe covering and the second pipe covering as the drainage pipe solution.

2. The computer-implemented method of claim 1, wherein the calculating the first pipe size and the first pipe slope based on the proper velocity comprises:
    (a) assuming the proper velocity based on a flow;
    (b) calculating a calculated first pipe size based on the proper velocity;
    (c) selecting, based on the calculated first pipe size, a first catalog pipe size from a pipe content catalog;
    (d) calculating a calculated pipe slope and calculated pipe velocity, for the first catalog pipe size, based on Manning's equation;
    (e) determining whether the calculated pipe velocity meets a requirement;
    (f) if the calculated pipe velocity meets the requirement, selecting the first catalog pipe size and the calculated pipe slope as the first pipe size and the first pipe slope respectively; and
    (g) if the calculated pipe velocity does not meet the requirement, selecting a new pipe size as the calculated pipe size, and repeating steps (d)-(g).

3. The computer-implemented method of claim 1, wherein the calculating the second pipe size and the second pipe slope based on the surface slope comprises:
    (a) assuming a flow;
    (b) calculating a calculated second pipe size based on the surface slope and the flow;
    (c) calculating a calculated pipe velocity;
    (d) ensuring that the calculated pipe velocity is within velocity requirements;
    (e) based on the calculated pipe velocity, selecting a second catalog pipe size from a pipe content catalog;
    calculating a second calculated pipe velocity and second calculated pipe slope, of the second catalog pipe size, based on Manning's equation;
    (g) determining whether the second calculated pipe velocity meets the velocity requirements;
    (h) if the second calculated pipe velocity is within the velocity requirements, selecting the second catalog pipe size and the second calculated pipe slope as the second pipe size and the second pipe slope respectively; and
    (i) if the second calculated pipe velocity is not within the velocity requirements, selecting a new catalog pipe size as the second catalog pipe size, and repeating steps (f)-(i).

4. The computer-implemented method of claim 1, further comprising repeating the steps for each segment of a drainage system.

5. The computer-implemented method of claim 1, wherein the surface segment comprises a pipe segment that is in between access holes.

6. The computer-implemented method of claim 1, further comprising constructing a drainage pipe system based on the drainage pipe solution.

7. The computer-implemented method of claim 1, further outputting the drainage pipe solution for use in constructing the drainage pipe solution.

8. A system for designing a drainage pipe solution comprising:
    (a) a computer having a memory;
    (b) a communication device on the computer that acquires, into the memory, a profile of a surface segment comprising a surface slope;
    (c) an application executing on the computer, wherein the application:
        (1) calculates a first pipe size and a first pipe slope based on a proper velocity;
        (2) calculates a second pipe size and a second pipe slope based on the surface slope;
        (3) computes a first pipe covering for the first pipe size for the surface segment;
        (4) computes a second pipe covering for the second pipe size for the surface segment; and
        (5) selects a lower of the first pipe covering and the second pipe covering as the drainage pipe solution.

9. The system of claim 8, wherein the application calculates the first pipe size and the first pipe slope based on the proper velocity by:
    (a) assuming the proper velocity based on a flow;
    (b) calculating a calculated first pipe size based on the proper velocity;
    (c) selecting, based on the calculated first pipe size, a first catalog pipe size from a pipe content catalog;
    (d) calculating a calculated pipe slope and calculated pipe velocity, for the first catalog pipe size, based on Manning's equation;

(e) determining whether the calculated pipe velocity meets a requirement;
(f) if the calculated pipe velocity meets the requirement, selecting the first catalog pipe size and the calculated pipe slope as the first pipe size and the first pipe slope respectively; and
(g) if the calculated pipe velocity does not meet the requirement, selecting a new pipe size as the calculated pipe size, and repeating steps (d)-(g).

10. The system of claim 8, wherein the application calculates the second pipe size and the second pipe slope based on the surface slope by:
(a) assuming a flow;
(b) calculating a calculated second pipe size based on the surface slope and the flow;
(c) calculating a calculated pipe velocity;
(d) ensuring that the calculated pipe velocity is within velocity requirements;
(e) based on the calculated pipe velocity, selecting a second catalog pipe size from a pipe content catalog;
calculating a second calculated pipe velocity and second calculated pipe slope, of the second catalog pipe size, based on Manning's equation;
(g) determining whether the second calculated pipe velocity meets the velocity requirements;
(h) if the second calculated pipe velocity is within the velocity requirements, selecting the second catalog pipe size and the second calculated pipe slope as the second pipe size and the second pipe slope respectively; and
(i) if the second calculated pipe velocity is not within the velocity requirements, selecting a new catalog pipe size as the second catalog pipe size, and repeating steps (f)-(i).

11. The system of claim 8, wherein the application repeats the steps for each segment of a drainage system.

12. The system of claim 8, wherein the surface segment comprises a pipe segment that is in between access holes.

13. The system of claim 8, wherein the application further constructs a drainage pipe system based on the drainage pipe solution.

14. The system of claim 8, further comprising an output device that outputs the drainage pipe solution for use in constructing the drainage pipe solution.

* * * * *